United States Patent
Bujalski et al.

[11] Patent Number: 5,814,271
[45] Date of Patent: Sep. 29, 1998

[54] PROCESS OF PRODUCING FIBERS FROM CURABLE ALK-1-ENYL ETHER FUNCTIONAL SILOXANE RESINS

[75] Inventors: Duane Ray Bujalski, Auburn; Kai Su, Midalnd, both of Mich.; Gregg Alan Zank, Tokyo, Japan

[73] Assignee: Dow Corning Corporation, Midland, Mich.

[21] Appl. No.: 903,553

[22] Filed: Jul. 31, 1997

Related U.S. Application Data

[62] Division of Ser. No. 707,120, Sep. 3, 1996, abandoned.

[51] Int. Cl.$^6$ .................................................. C04B 35/56
[52] U.S. Cl. ......................... 264/625; 264/627; 264/82; 264/640; 264/470; 264/477; 528/32
[58] Field of Search .................... 264/625, 627, 264/82, 470, 477, 640

[56] References Cited

U.S. PATENT DOCUMENTS

| | | | |
|---|---|---|---|
| 4,100,233 | 7/1978 | Yajima et al. | 264/625 |
| 4,289,720 | 9/1981 | Yajima et al. | 264/625 |
| 5,071,600 | 12/1991 | Deleeuw et al. | 264/22 |
| 5,167,881 | 12/1992 | Atwell et al. | 264/22 |
| 5,268,336 | 12/1993 | Deleeuw et al. | 501/88 |
| 5,358,674 | 10/1994 | Rabe | 264/22 |
| 5,366,943 | 11/1994 | Lipowitz et al. | 501/95 |

FOREIGN PATENT DOCUMENTS 2266301  10/1993  United Kingdom.

*Primary Examiner*—James Derrington
*Attorney, Agent, or Firm*—Sharon K. Severance

[57] ABSTRACT

The present invention relates to a method for preparing a ceramic fiber wherein the method comprises (A) forming a green fiber from an alk-1-enyl ether functional siloxane resin of the general formula $(R^1SiO_{3/2})_q(R^2SiO_{3/2})_r(R^1{}_wR^2{}_x RSiO_{(3-w-x)/2})_s(R^1{}_wR^2{}_xR^3SiO_{(3-w-x)/2})_t$, wherein R is an alk-1-enyl ether group; each $R^1$ is selected from an aryl group having from 6 to 10 carbon atoms; each $R^2$ is selected from an alkyl group having from 1 to 4 carbon atoms; $R^3$ is an alkenyl group having from 2 to 10 carbon atoms; w has a value of 0, 1 or 2; x has a value of 0, 1, or 2 with the provisio that $w+x \leq 2$; q has a value of 0 to 0.98; r has a value of 0 to 0.98; s is greater than zero; $t \geq 0$; s+t=0.02 to 0.5 and q+r+s+t=1; (B) curing the green fiber to render it non-fusible; and (C) heating the non-fusible fiber in an inert environment to a temperature above 800° C. to convert it to a ceramic fiber.

14 Claims, 1 Drawing Sheet

PROCESS OF PRODUCING FIBERS FROM CURABLE ALK-1-ENYL ETHER FUNCTIONAL SILOXANE RESINS

This application is a division of application Ser. No. 08/707,120 filed Sep. 3, 1996 which application is now abandoned.

BACKGROUND OF THE INVENTION

This invention relates to a method for preparing a ceramic fiber from an alk-1-enyl ether functional siloxane resin with a glass transition temperature that is suitable for melt-spinning and to the SiCO and SiC ceramic fibers that are produced from the polymers.

Currently, commercially available silicon oxycarbide fibers, such as Nicalon™ and Tyrano™ fibers, are exclusively prepared from expensive polycarbosilane precursors. Use of polycarbosilanes presents several difficulties in the production of the SiCO fibers. For example, the polymer's slow crosslinking and the green fiber's fragility inhibit the use of continuous processing. Additionally, due to low yields and a complicated processes the resulting fibers are expensive.

The use of certain siloxane resins as precursors to SiCO and SiC fibers is known in the art. For Example, U.S. Pat. No. 5,167,881 to Atwell et al. discloses the production of SiC fibers from phenyl containing polyorganosiloxane resins with 3–6 wt % OH groups. U.S. Pat. No. 5,358,674 to Rabe discloses the formation of ceramic fibers from a linear polysiloxane fluid that contains a photoinitiator. The green fibers are cured by UV radiation and pyrolyzed to give ceramic fibers. GB Patent 2 266 301 to Leung discloses the production of SiCO black glass fibers from dry spinning of cyclosiloxane polymers, followed by thermal cure. However, these polymers are difficult to spin and the green fibers are fragile. The polymers have thermal stability problems at melt spinning temperatures and the fibers do no sufficiently cure (infusibilize) thus resulting in fibers that adhere to each other and cannot be separated.

It is an object of the instant invention to provide an alk-1-enyl ether functional resin that has a glass transition temperature that is suitable for melt-spinning, is thermally stable and allows rapid on-line cure.

It is further an object of the instant invention to provide SiC fibers and SiCO fibers produced from the alk-1-enyl ether functional resin.

SUMMARY OF THE INVENTION

The present invention relates to alk-1-enyl ether functional resins, a method for preparing a ceramic fiber and to the ceramic fibers produced therefrom. The method comprises (A) forming a fiber from an alk-1-enyl ether functional siloxane resin of the general formula $(R^1SiO_{3/2})_q(R^2SiO_{3/2})_r(R^1_wR^2_xRSiO_{(3-w-x)/2})_s(R^1_wR^2_xR^3SiO_{(3-w-x)/2})_t$ wherein R is an alk-1-enyl ether group; each $R^1$ is selected from an aryl group having from 6 to 10 carbon atoms; each $R^2$ is selected from an alkyl group having from 1 to 4 carbon atoms; $R^3$ is an alkenyl group having from 2 to 10 carbon atoms; w has a value of 0, 1 or 2; x has a value of 0, 1, or 2 with the provisio that w+x≦2; q has a value of 0 to 0.98; r has a value of 0 to 0.98; s is greater than zero; t≧0; s+t=0.02 to 0.5 and q+r+s+t=1; (B) curing the fiber to render it non-fusible; and (C) heating the non-fusible fiber in an inert environment to a temperature above about 800° C. to convert it to a ceramic fiber. The alk-1-enyl ether functional siloxane resins employed herein show excellent thermal stability and can be melt-spun into small diameter green fibers. The green fibers exhibit fast cure and the cure can be carried out either on-line or in a batch cure fashion.

THE INVENTION

Figure 1:
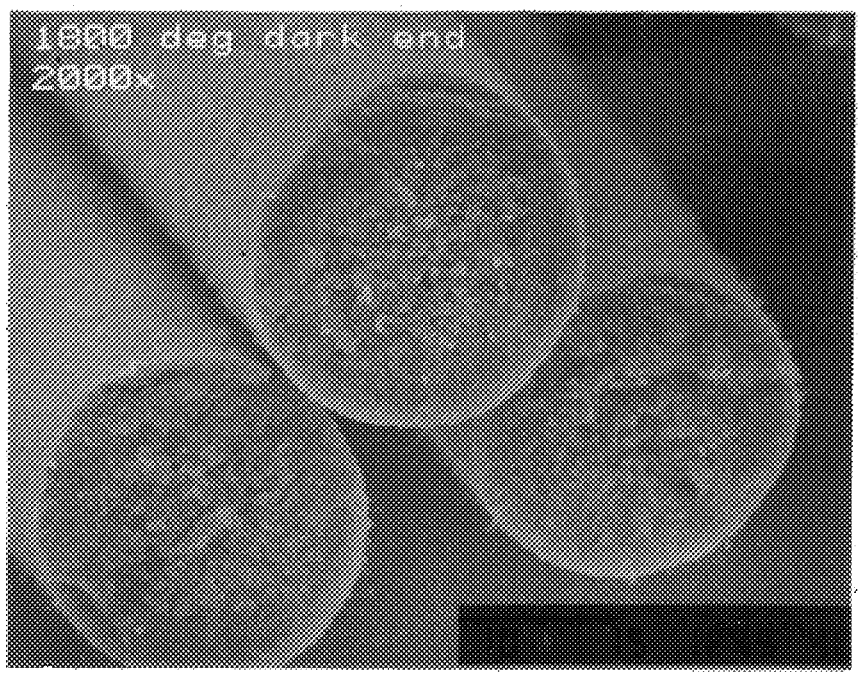
FIG. 1 is a photomicrograph (magnification 3500×) taken with a scanning electron microscope of SiC fibers produced in Example 7.

The instant invention pertains to the use of an alk-1-enyl ether functional siloxane resin as a precursor to SiCO and SiC fibers. The alk-1-enyl ether functional siloxane resins show excellent thermal stability and can be spun into small diameter green fibers. The method of the instant invention comprises spinning the alk-1-enyl ether functional siloxane resin into a green fiber, curing the green fiber and thereafter pyrolyzing the fiber to form the ceramic fiber.

The alk-1-enyl ether functional siloxane resins useful in the instant invention are of the general formula $(R^1SiO_{3/2})_q(R^2SiO_{3/2})_r(R^1_wR^2_xRSiO_{(3-w-x)/2})_s(R^1_wR^2_xR^3SiO_{(3-w-x)/2})_t$ wherein R is an alk-1-enyl ether group; each $R^1$ is selected from an aryl group having from 6 to 10 carbon atoms; each $R^2$ is selected from an alkyl group having from 1 to 4 carbon atoms; $R^3$ is an alkenyl group having from 2 to 10 carbon atoms; w has a value of 0, 1 or 2; x has a value of 0, 1, or 2 with the provisio that w+x≦2; q has a value of 0 to 0.98; r has a value of 0 to 0.98; s is greater than zero; t≦0; s+t=0.02 to 0.5 and q+r+s+t=1. Preferably q has a value of 0.3 to 0.5; r has a value of 0.3 to 0.5; s has a value of 0.15 to 0.3 and t has a value of 0.02 to 0.1.

In the above formula $R^1$ may be exemplified by phenyl, tolyl and others, preferably phenyl. $R^2$ may be exemplified by methyl, ethyl and propylmethyl, preferably methyl. $R^3$ may be exemplified by vinyl, hexenyl, allyl and others.

In the above formula R represents an alk-1-enyl ether group of the general formula

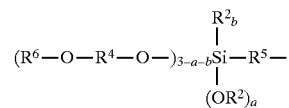

where $R^2$ is an alkyl group having from 1 to 4 carbon atoms such as methyl, ethyl, propyl, iso-propyl and others; $R^5$ is selected from the group consisting of an alkylene groups having from 2 to 10 carbon atoms (ie. $-(CH_2)_c-$ where c is 2 to 10) such as ethylene, propylene, butylene, pentylene, hexylene and others and cycloalkylalkylene groups having from 5 to 10 carbon atoms (i.e. $-(CH_2)_d-(C_eH_{2(e-1)})-$ where d is 1 to 6 and e is 4 to 9) such as cyclohexylmethylene, cyclohexylethylene and others; $R^5$ is an alkylene group having from 2 to 10 carbon atoms such as ethylene, propylene, butylene, pentylene, hexalyene and others; $R^6$ is an alk-1-enyl group having from 2 to 10 carbon atoms (i.e. $-CH=CH(CH_2)_sH$ where s is 0 to 8) such as vinyl, prop-1-enyl, but-1-enyl, pent-1-enyl, hex-1-enyl and others; a has a value of 0, 1 or 2, b has a value of 0, 1 or 2 and a+b=0, 1 or 2.

Preferably the alk-1-enyl ether group is

where b=0, 1 or 2, preferably 0; and 3−b=1, 2 or 3, preferably 3.

Preferably the resins useful herein are of the formula $(PhSiO_{3/2})_q(CH_3SiO_{3/2})_r((CH_3)_2RSiO_{1/2})_s((CH_3)_2ViSiO_{1/2})_t$ wherein R is an alk-1-enyl ether group, Ph represents a phenyl group, Vi represents a vinyl group and q, r, s and t are as described above.

The resins of the instant invention are prepared by reacting an alkenyl functional resin having a glass transition of 50° to 200° C., preferably from 90° to 125° C. of the general formula $(R^1SiO_{3/2})_q(R^2SiO_{3/2})_r(R^1_wR^2_xR^3SiO_{(3-w-x)/2})_{s+t}$ wherein $R^1$, $R^2$, $R^3$ q, r, s, t, w and x are as described previously with an alkoxy silane of the general formula $HSiR^2_m(OR^2)_{3-m}$ where $R^2$ is as described previously and m has a value of 0, 1 or 2. The resulting alkoxy functional resin is then reacted with a hydroxyalk-1-enyl ether compound of the general formula $R^6$—O—$R^4$—OH where $R^6$ and $R^4$ are as described previously.

Alkenyl functional resins of the general formula $(R^1SiO_{3/2})_q$ $(R^2SiO_{3/2})_r(R^1_wR^2_xR^3SiO_{(3-w-x)/2})_{s+t}$ are well known in the art. The actual method used to prepare the alkenyl functional resins is not critical. However, prior to their use in the instant invention, the alkenyl functional resin needs to be fractionated to produce a resin having a glass transition of 50° to 200° C., preferably having a Mw/Mn ratio of less than 2.10. The resin may be fractionated by any method known in the art such as solvent precipitation, solvent extraction, supercritical fluid extraction, distillation to remove low molecular weight components and others. One method of solvent precipitation includes dissolving the crude resin in a solvent such as toluene; and thereafter adding the solution to methanol in order to precipitate the resin. The precipitate (the fractionated resin) is then collected and dried.

The fractionated alkenyl functional resin is then reacted with an alkoxy silane of the general formula $HSiR^2_m(OR^2)_{3-m}$ where $R^2$ and m are as described previously. Suitable alkoxy silanes may be exemplified by trimethoxysilane, triethoxysilane, methyldimethoxysilane, methyldiethoxysilane and others. Preferably the alkoxy silane is a triethoxysilane. The alkoxy silane is present in an amount of less than an equimolar amount of —C=C— on the resin. Typically the amount of alkoxy silane present is enough to react from 0.1 to 10 mol % of the alkenyl groups on the resin, preferably is enough to react from 1 to 6 mol % of the alk-1-enyl groups. If there is too much alkoxy functionality on the resin the resulting alk-1-enyl ether functional resin has a glass transition temperature that is not suitable for melt-spinning and thus not preferred in the instant invention.

This reaction between the alkenyl functional resin and the alkoxysilane is typically carried out in the presence of a hydrosilylation catalyst. Such hydrosilylation catalysts are well known in the art and preferably are platinum containing catalysts. Suitable platinum containing catalysts are well known in the art and may be exemplified by, but not limited to, platinum metal, platinum compounds, and platinum complexes. The platinum compounds and platinum complexes may be exemplified by chloroplatinic acid, chloroplatinic acid hexahydrate, Karstedt's catalyst (Pt (ViMe$_2$SiOSiViMe$_2$)$_2$), dichloro-bis(triphenylphosphine) platinum (II), cis-dichloro-bis(acetonitrile)platinum(II), dicarbonyldichloro-platinum(II), platinum chloride, platinum oxide and others. The platinum metal can be deposited on a support such as charcoal, alumina, zirconia, carbon, silica gel, nylon, polyacrylonitrile, and others. Any platinum containing material which effects the reaction between the silicon hydride and the unsaturated portion of the alkenyl resin is useful in the instant invention.

The platinum containing catalyst is present in an amount sufficient to provide at least 0.1 to 1,000; preferably 1 to 500; most preferably 10 to 300 parts by weight of platinum for every one million parts by weight of the combined weight of the alkenyl functional resin and alkoxy silane.

The reaction may be run at room temperature, but it is preferably run with heating in order to obtain good reaction rates. Typically the reaction mixture is heated from 30° C. to 150° C., preferably from 80° C. to 125° C. The reaction is run until completion as indicated by the complete disappearance of alkoxysilanes (i.e. —SiH). One skilled in the art would be able to determine when the reaction is complete by common analytical methods such as NMR. The time to reach completion will vary depending on the reactants used and the reaction conditions. One skilled in the art will be readily able to determine the time required for completing the reaction.

The reaction is typically carried out in the presence of a suitable solvent. Suitable solvents include, but are not limited to, aromatic hydrocarbons such as toluene, benzene, xylene and others; aliphatic hydrocarbons such as hexane, heptane, cyclohexane and others; ethers such as tetrahydrofuran, diethyl ether and others; ketones such as acetone, methyl ethyl ketone and others; esters such as ethyl acetate, butyl acetate and others.

The resulting alkoxy functional resin is then reacted with a hydroxyalk-1-enyl ether compound of the general formula $R^6$—O—$R^4$—OH where $R^6$ and $R^4$ are as described previously. The resulting alkoxy functional resin may first be isolated from the previous reaction mixture before reaction with the hydroxyalk-1-enyl ether however, it is preferred to carry out the reaction sequentially without isolating the alkoxy functional resin. The hydroxyalk-1-enyl ether compounds useful in the instant invention may be exemplified by, but not limited to, hydroxybutyl vinyl ether, hydroxyethylvinyl ether, hydroxybutyl prop-1-enyl ether, hydroxyethyl but-1-enyl ether, hydroxyhexyl vinyl ether, hydroxyethyl 2-butyl hex-1-enyl ether, the vinyl ether of di-hydroxymethylcyclohexane (cyclohexanedimethanol monovinyl ether) and others. Hydoxybutyl vinyl ether is the preferred hydroxyalk-1-enyl ether.

The hydroxyalk-1-enyl ether compound is typically present to provide an equimolar amount of HO— to $R^2O$— in the alkoxy functional resin such that all of the alkoxy functionality is converted into alk-1-enyl ether functionality. However, the hydroxyalk-1-enyl ether compound may be present in amounts more or less than an equimolar amount.

A catalyst may be used in the reaction to promote the interchange between the alkoxy groups of the resin and the hydroxyl groups of hydroxyalk-1-enyl ether compound. Any catalyst known in the art that are suitable for promoting such interchange may be used in the instant invention. Suitable catalysts include, but are not limited to metal salts of monocarboxylic acids, such as stannous octoate, dibutyltin dilaurate, and dibutyltin diacetate; titanium esters such as tetrabutyl titanate, tetraethylhexyl titanate and tetraphenyltitanate; siloxytitanates, such as tetrakis(trimethylsiloxy) titanium and bis(trimethylsiloxy)-bis(isopropoxy)titanium; and betadicarbonyltitanium compounds, such as bis (acetylacetonyl)diisopropyl titanate; amines, such as hexylamine and their acetate and quat salts. The preferred catalyst is tetraisopropoxy titanate.

The reaction may be run at room temperature, but it is preferably run with heating in order to obtain good reaction rates. Typically the reaction mixture is heated to the reflux temperature of the reaction mixture so that any alcohol formed is continuously removed from the reaction mixture. The reaction is run until completion as indicated by the disappearance of alcohol in the overheads. One skilled in the art will be able to readily determine when the reaction is complete. This reaction may also be carried out in the presence of a suitable solvent. Suitable solvents are identified above. Preferably the solvent used during this reaction is the same solvent used during the hydrosilylation reaction between the alkenyl functional resin and alkoxy silane.

It is preferred that the alk-1-enyl ether functional siloxane resins of the instant invention have a glass transition temperature of greater than 35° C. The glass transition temperature of the alk-1-enyl ether functional siloxane resin is dependent upon a number of factors including the alkoxy and/or alk-1-enyl ether content and molecular weight and distribution of the starting alk-1-enyl functional resin. The resulting alk-1-enyl ether functional siloxane resins are generally solids with a softening temperature in the range of 35° to 70° C.

The alk-1-enyl ether functional siloxane resins of the instant invention may be fired in an inert atmosphere or in a vacuum to a temperature of at least 800° C. until a silicon-carbon ceramic material is obtained. Preferably the pyrolysis temperature is 1000° C. or higher.

The alk-1-enyl ether resins of the instant invention may be formed into shaped articles prior to pyrolysis. Fibers are the preferred shaped article. The alk-1-enyl ether resins of the instant invention may be spun into a fiber by conventional spinning techniques such as melt spinning, wet spinning or dry spinning. It is most convenient to melt the resins and extrude them through an orifice such as a spinneret (ie. melt-spin) and then draw them into diameters of less than about 100 micrometers. More preferably, the fibers are drawn into diameters of about 10 to 50 micrometers.

The fibers formed above are then cured (infusibilized) to render them non-fusible and to prevent them from deforming when pyrolyzed. By infusibilizing it is meant that the fiber, when heated rapidly up to the pyrolysis temperature will not fuse together. A screen for infusibility is provided by the solubility of the fiber in toluene. An infusible fiber is essentially insoluble in toluene or has a limited solubility in toluene.

The fibers may be cured by any method known in the art such as heating in air, treating the fiber in an atmosphere containing an acid; exposing the fiber to radiation such as EB, x-ray and UV light; treating the fiber in an oxidizing atmosphere such as nitric oxide (NO) and ozone or by exposing the fibers to hydrazine vapors under an inert atmosphere. It is also possible to cure the fibers and at the same time have boron incorporated therein, by curing the fibers in an atmosphere containing a mixture of boron trichloride.

It is preferable to cure the fibers of the instant invention by treating the fibers in an atmosphere containing an acid. Acids useful in the instant invention include, but are not limited to hydrogen chloride, hydrogen bromide, hydrochloric acid, hydrobromic acid, trifluromethansulfonic acid, sulfuric acid, $HSbF_6$, $HAsF_6$, $HPF_6$, $HBF_4$ and others. HCl is preferred for curing.

The fibers may be cured on-line during the spinning process, batch following the spinning process or an on-line/batch combination. By on-line cure it is meant that the fibers are exposed to the cure mechanism as they are being formed but before they are collected on a take-up spool. By batch cure it is meant that the fibers are collected on the spool without curing, then cured by exposing the spool of fibers. During a batch cure, typically the fibers are heated in the presence of the acid to a temperature of 50° to 250° C. for a period of 5 to 60 minutes to render them infusible. When on-line curing the fibers of the instant invention it is preferable to further batch cure the fibers after they have been collected on the take-up spool.

The cured fibers are then heated (pyrolyzed) in an inert environment to a temperature above about 800° C. to convert it to a ceramic fiber, and preferably to temperatures at or above 1000° C. in a non-oxidizing environment. For purposes of this invention a non-oxidizing environment should contain less than 100 ppm of oxygen. The fibers are heated at the desired temperatures for a time sufficient to form the SiCO fibers. Alternatively, the pyrolysis temperature can be ramped up, held at the desired maximum temperature and ramped down. This heating can be performed on a continuous basis or the cured fiber can be collected and batch pyrolyzed. Methods for pyrolyzing polysiloxane polymer fibers into ceramic fibers are well known in the art and can be used herein.

The ceramic fibers of the instant invention have compositional stability up to 1300° C. and typically are comprised of 20 to 60 wt % Si, 20 to 60 wt % O and 30 to 70 wt % C.

SiC fibers may be produced by doping the non-fusible fibers with a boron source and thereafter heating the doped fibers sufficiently to remove oxygen as described in U.S. Pat. Nos. 5,071,600 to Deleeuw et al; 5,167,881 to Atwell et al.; 5,268,336 to Deleeuw et al. and 5,366,943 to Lipowitz et al. which are incorporated herein by reference for its teaching of how to produce SiC fibers. U.S. Pat. Nos. 5,071,600, 5,167,881, 5,268,336 all teach methods wherein the fiber is doped with boron in order to produce polycrystalline SiC fibers. The incorporation of boron is accomplished either prior to or during the formation of the fibers, during at least one of the infusibilizing step or during the initial heating period of the pyrolysis. One preferred method for doping the fibers comprises exposing the cured green fibers to diborane ($B_2H_6$) gas in argon. The diborane is typically present in the argon in an amount from 0.01 to about 1 percent by volume. The fibers are typically heated to a temperature of from 200° C. to 300° C., preferably from 240° to 260° C. during the exposure to the diborane.

U.S. Pat. No. 5,366,943 teaches a method comprising heating a ceramic fiber (SiCO fiber) in an environment containing a volatile sintering aid such as boron to produce the SiC fiber. Other volatile sintering aids include iron, magnesium, lithium, beryllium, boron, aluminum, thorium, yttrium, lanthanum, cerium, and compounds thereof.

The ceramic fibers produced by the method of the instant invention are useful as the reinforcing phase in various composite applications.

So that those skilled in the art can understand and appreciate the invention taught herein, the following examples are presented, it being understood that these examples should not be used to limit the scope of this invention found in the claims.

EXAMPLE 1

Synthesis of vinyl functional resin having a high glass transition temperature.

277.6 g of phenyltrimethoxysilane, 218.0 g of methyltrimethoxysilane and 93.6 g of 1,1,2,2-tetramethyl-1,2-divinyl siloxane were charged into a 3 L flask equipped with a condenser and a mechanical stirrer, under argon. 6.8 g of trifluoromethane sulfonic acid dissolved in 20 mL deionized water was added to the flask. The mixture was heated to reflux for 90 min. Following the heating 800 mL of toluene and 300 mL of water were added. The solution was heated to reflux for an additional 90 minutes. 12 g of calcium carbonate was then added and the solvent was distilled until the overhead temperature increased to 81° C. Additional toluene was then added to adjust the solid content to 45 wt %. Aqueous 3 wt % potassium hydroxide (40 mL) was added and the water was azeotropically removed using a Dean-Stark Apparatus. After water was removed from the reaction mixture (approx. 4 hours) the reflux was continued for another 9.5 hours before cooling to 50°–60° C. Chlorodimethylvinylsilane (22.1 g) was added and the solution was stirred at room temperature overnight. The solution was first filtered through a Celatom filter-aid, followed by filtration through a 0.45 micron membrane. 20 mL of the solution was then vacuum dried.

The dried resin was diluted with toluene to 1000 mL and then added dropwise to 8 L of methanol (toluene/methanol 1:8 v/v) under mechanical stirring. The white precipitate was collected and dried at 80° C. in vacuo to yield 200.7 g of a resin having a Mw of 10,173, Mn of 5,619 and $T_g$ 98° C.

EXAMPLE 2

Synthesis of an vinyl ether functional polysiloxane resin.

A 40.2 g sample of the siloxane polymer prepared in Example 1 was charged into a 250 mL flask equipped with a distillation apparatus. The flask was evacuated and back filled with argon. 1.161 g of $HSi(OEt)_3$, 60 mL of toluene and 0.5 mL of a chloroplatinic acid complex of divinyltetramethyldisiloxane diluted with dimethylvinylsiloxy endblocked polydimethylsiloxane to provide 22.4 weight percent platinum were added and the mixture was heated in an oil bath at 110° C. for 3 hours. 60 mL of toluene, 2.26 g of hydroxylbutylvinyl ether and 0.05 mL $Ti(Oi-Pr)_4$ were added and the solution was further heated to the reflux temperature for 3.5 h with continuous distillation of ethanol/toluene. After the reaction was over, the solution was filtered through a 0.1 micron membrane under argon protection and vacuum dried. The alk-1-enyl ether functional siloxane resin was obtained as a brownish solid in near quantitative yield. The resulting product has a Mw of 15,572, Mn 7,338 and $T_g$ 52° C.

EXAMPLE 3

Cure and pyrolysis of the vinyl ether functional siloxane resin.

A 5.5 g sample of the vinyl ether functional siloxane resin prepared in Example 2 was placed into a 100 mL flask equipped with a gas inlet and an outlet. The polymer was cured by a continuous treatment with HCl gas (10 mL/min) at room temperature for 15 min.

1.8 g of the HCl cured resin sample was placed in a graphite crucible and heated under argon in a Linberg tube furnace to 1200° C. (10° C./min) and held at this temperature for 1 h before cooling to ambient temperature. 1.35 g of black ceramic was obtained in 75% ceramic yield. The ceramic material had the following composition: 35.88% Si, 35.77% C, 0.19% H. An x-ray powder diffraction (XRD) analysis of this sample revealed only amorphous humps at 2 theta of 24 and 44 degree.

A 1.94 g sample of the HCl cured resin sample was placed in a graphite crucible and heated in an Astro furnace to 1800° C. (10° C./min)and held at temperature for 1 h before cooling to ambient temperature. 0.74 g of ceramic material was obtained. The ceramic material had the following composition: 65.11% Si, 30.74% C, 0.17% H. An x-ray powder diffraction (XRD) analysis of this sample revealed 99% beta SiC and 1% alpha SiC.

EXAMPLE 4

Fiber spinning and batch cure.

The vinyl ether functional siloxane resin prepared in Example 2 was melt-spun into single filament fibers in the 90° to 120° C. range. For melt-spinning, 5.2 g of the vinyl ether functional siloxane resin was ground into a fine powder with a mortar and pestle and pressed at 500 psi into a rod at low temperatures. The polymer rod was transferred into the extruder under argon. The polymer was then heated to 90° to 120° C. and fibers were taken-up (35–50 m/min) on a spool. The green fibers were then hung in a quartz tube equipped with a gas inlet and a gas outlet. The tube was purged with argon for 5 min before HCl/argon (0–100% HCl) was introduced into the tube. After 5 min of treatment at room temperature, the tube was heated quickly to a temperature between 50° C. and 200° C. and held for 15 min to cure the fibers.

EXAMPLE 5

Fiber spinning and on-line cure.

The vinyl ether functional siloxane resin prepared in Example 2 was melt-spun into single filament fibers in the 90° to 120 20 C. range. For melt-spinning, 5.2 g of the vinyl ether functional siloxane resin was ground into a fine powder with a mortar and pestle and pressed at 500 psi into a rod at low temperatures. The polymer rod was transferred into the extruder under argon. The polymer was then heated to 90° to 120° C. and fibers were taken-up (35–50 m/min) on a spool with on-line HCl treatment (0.1–100% HCl in argon). After on-line HCl gas exposure, the green fibers were cured as evidenced by their insolubility in toluene.

EXAMPLE 6

Preparation of SiCO Fibers.

The fibers prepared in Examples 4 and 5 were heated at 3° C./min to 1200° C. and held at this temperature for 1 h. The SiCO fibers were obtained in 75 to 80% ceramic yield and had a composition of $Si_{1.00}C_{2.33}O_{1.38}$.

EXAMPLE 7

Preparation of SiC Fibers.

The HCl cured green fibers prepared in Example 4 and 5 were hung in a quartz tube equipped with a gas inlet and a gas outlet. The tube was purged with argon for 20 min before a diborane/argon mixture (0.186% $B_2H_6$, 88 cc/min) was introduced into the tube. The tube was then heated quickly to a temperature in between 240° C. and 260° C. and held for 2 h. After the experiment, the tube was further purged with argon for 20 min. The fiber samples that were treated with diborane were then heated to 1800° C. at 3° C./min under argon and held at temperature for 10 min. Auger analysis of the ceramic fiber cross section exhibits near stoichiometric SiC at ca. 150 nm depth from the surface. A photomicrograph was taken with a scanning electron microscope and is shown in FIG. 1.

EXAMPLE 8

Preparation of SiC Fibers.

Figure 2:
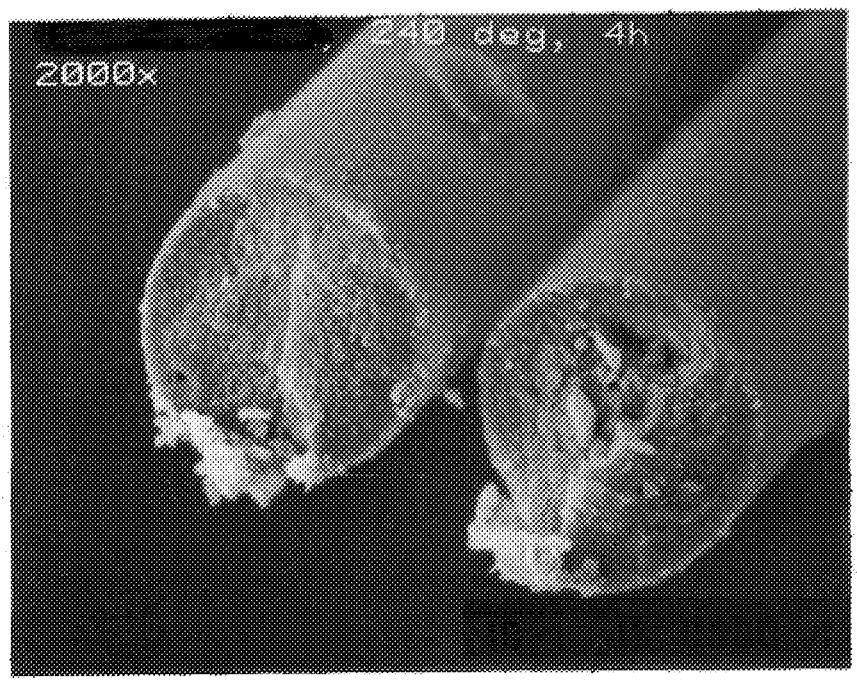
FIG. 2 is a photomicrograph (magnification 3500×) taken with a scanning electron microscope of SiC fibers produced in Example 8.

The SiCO fibers prepared in Example 6 were heated to 1550° C. at 3° C./min under argon and held at temperature for 8 h under argon in the presence of $B_2O_3$. The sample was then heated to 1800° C. under argon and held at temperature for 10 min. Auger analysis of the ceramic fiber cross section exhibits near stoichiometric SiC at ca. 150 nm from the surface. A photomicrograph was taken with a scanning electron microscope and is shown in FIG. 2.

What is claimed is:

1. A method for preparing a ceramic fiber comprising
   (A) forming a fiber from an alk-1-enyl ether functional siloxane of the formula $(R^1SiO_{3/2})_q(R^2SiO_{3/2})_r(R^1_wR^2_xRSiO_{(3-w-x)/2})_s(R^1_wR^2_xR^3SiO_{(3-w-x)/2})_t$, wherein R is an alk-1-enyl ether group; each $R^1$ is selected from an aryl group having from 6 to 10 carbon atoms; each $R^2$ is selected from an alkyl group having from 1 to 4 carbon atoms; $R^3$ is an alkenyl group having from 2 to 10 carbon atoms; w has a value of 0, 1 or 2; x has a value of 0, 1, or 2 with the provisio that w+x≦2; q has a value of 0 to 0.98; r has a value of 0 to 0.98; s is greater than zero; t≧0; s+t=0.02 to 0.5 and q+r+s+t=1;
   (B) curing the fiber of (A);
   (C) heating the fiber of (B) in an inert environment to a temperature above about 800° C. to convert the fiber of (B) to a ceramic fiber.

2. The method as claimed in claim 1 wherein the fiber formed in (A) is formed by melt spinning.

3. The method as claimed in claim 1 wherein the alk-1-enyl ether group is of the formula

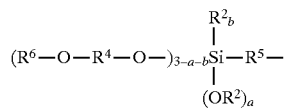

where $R^2$ is an alkyl group having from 1 to 4 carbon atoms; $R^4$ is selected from the group consisting of alkylene groups having from 2 to 10 carbon atoms and cycloalkylalkylene groups having from 5 to 10 carbon atoms; $R^5$ is an alkylene group having from 2 to 10 carbon atoms; $R^6$ is an alk-1-enyl group having from 2 to 10 carbon atoms; a has a value of 0 to 2, b has a value of 0 to 2 and a+b≦2.

4. The method as claimed in claim 3 wherein the alk-1-enyl ether group is —CH$_2$—CH$_2$—Si—(OCH$_2$CH$_2$CH$_2$CH$_2$OCH=CH$_2$)$_3$.

5. The method as claimed in claim 1 wherein the alk-1-enyl ether functional siloxane has the formula $(PhSiO_{3/2})_q(CH_3SiO_{3/2})_r((CH_3)_2RSiO_{1/2})_s((CH_3)_2ViSiO_{1/2})_t$ wherein R is an alk-1-enyl ether group, Ph represents a phenyl group and Vi represents a vinyl group.

6. The method as claimed in claim 1 wherein the alk-1-enyl ether functional siloxane has a glass transition temperature ≧35° C.

7. The method as claimed in claim 1 wherein the fiber of (A) is cured by exposing the fiber to an atmosphere containing an acid.

8. The method as claimed in claim 7 wherein the acid is selected from the group consisting of hydrogen chloride, hydrogen bromide, hydrochloric acid, hydrobromide acid, trifluromethansulfonic acid, sulfuric acid, HSbF$_6$, HAsF$_6$, HPF$_6$, and HBF$_4$.

9. The method as claimed in claim 8 wherein the acid is HCl.

10. The method as claimed in claim 7 wherein the fiber of (A) is cured by exposing the fiber on-line to an atmosphere containing an acid.

11. The method as claimed in claim 1 wherein the fiber of (B) is heated in an inert environment to a temperature above about 1000° C.

12. A method for preparing a polycrystalline silicon carbide fiber comprising
    (A) forming a fiber from an alk-1-enyl ether functional siloxane resin of the formula $(R^1SiO_{3/2})_q(R^2SiO_{3/2})_r(R^1_wR^2_xRSiO_{(3-w-x)/2})_s(R^1_wR^2_xR^3SiO_{(3-w-x)/2})_t$ wherein R is an alk-1-enyl ether group; each $R^1$ is selected from an aryl group having from 6 to 10 carbon atoms; each $R^2$ is selected from an alkyl group having from 1 to 4 carbon atoms; $R^3$ is an alkenyl group having from 2 to 10 carbon atoms; w has a value of 0, 1 or 2; x has a value of 0, 1, or 2 with the provisio that w+x≦2; q has a value of 0 to 0.98; r has a value of 0 to 0.98; s is greater than zero; t≧0; s+t=0.02 to 0.5 and q+r+s+t=1;
    (B) curing the fiber of (A);
    (C) heating the fiber of (B) in an inert environment to a temperature above about 1500° C. to convert the fiber of (B) to a ceramic fiber wherein the fiber of (B) has incorporated therein at least about 0.2 wt % boron.

13. The method as claimed in claim 12 wherein the boron is incorporated into the fiber of (B) by heating the fiber of (B) in an environment comprised of 0.01 to about 1% by volume diborane in argon.

14. A method for preparing a polycrystalline silicon carbide fiber comprising
    (A) forming a fiber from an alk-1-enyl ether functional siloxane resin $(R^1SiO_{3/2})_q(R^2SiO_{3/2})_r(R^1_wR^2_xSiO_{(3-w-x)/2})_s(R^1_wR^2_xR^3SiO_{(3-w-x)/2})_t$ wherein R is an alk-1-enyl ether group; each $R^1$ is selected from an aryl group having from 6 to 10 carbon atoms; each $R^2$ is selected from an alkyl group having from 1 to 4 carbon atoms; $R^3$ is an alkenyl group having from 2 to 10 carbon atoms; w has a value of 0, 1 or 2; x has a value of 0, 1, or 2 with the provisio that w+x≦2; q has a value of 0 to 0.98; r has a value of 0 to 0.98; s is greater than zero; t≧0; s+t=0.02 to 0.5 and q+r+s+t=1;
    (B) curing the fiber of (A);
    (C) heating the fiber of (B) in an inert environment to a temperature above about 800° C. to convert the fiber of (B) to a ceramic fiber; and
    (D) thereafter heating the ceramic fiber in an environment containing a volatile sintering aid selected from the group consisting of iron, magnesium, lithium, beryllium, boron, aluminum, thorium, yttrium, lanthanum, cerium and compounds thereof to a temperature to covert the ceramic fiber to a polycrystalline silicon carbide fiber and for a time sufficient to allow incorporation of the sintering aid into the ceramic fiber.

* * * * *